(12) United States Patent
Woodall, Jr. et al.

(10) Patent No.: US 9,217,452 B1
(45) Date of Patent: Dec. 22, 2015

(54) BLIND FASTENER ASSEMBLY AND RELEASE PIN APPARATUS

(71) Applicants: Robert C. Woodall, Jr., Panama City, FL (US); Christopher J. Doyle, Panama City Beach, FL (US)

(72) Inventors: Robert C. Woodall, Jr., Panama City, FL (US); Christopher J. Doyle, Panama City Beach, FL (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 67 days.

(21) Appl. No.: 13/907,476

(22) Filed: May 31, 2013

(51) Int. Cl.
*F16B 19/10* (2006.01)
*F16B 13/06* (2006.01)

(52) U.S. Cl.
CPC ............. *F16B 13/063* (2013.01); *F16B 19/109* (2013.01); *F16B 19/1081* (2013.01)

(58) Field of Classification Search
USPC ................ 411/44–48, 57.1, 347, 348, 551
See application file for complete search history.

(56) References Cited

U.S. PATENT DOCUMENTS

| | | | | |
|---|---|---|---|---|
| 1,700,354 A * | 1/1929 | Foss | ............................. | 411/80.1 |
| 2,301,244 A * | 11/1942 | Bishop | ........................ | 411/80.2 |
| 2,438,533 A * | 3/1948 | Booth | .......................... | 411/80.6 |
| 4,187,757 A * | 2/1980 | Frischmann et al. | ........... | 411/15 |
| 4,934,885 A * | 6/1990 | Woods et al. | ................... | 411/44 |
| 5,718,547 A * | 2/1998 | Eischeid | ......................... | 411/48 |
| 6,474,920 B2 * | 11/2002 | Lin | ............................... | 411/385 |

* cited by examiner

*Primary Examiner* — Flemming Saether
(74) *Attorney, Agent, or Firm* — James T. Shepherd

(57) ABSTRACT

A blind fastener assembly utilizes flexible legs extending from a cylindrical section of a spring pin. Gripping elements extend radially outwardly from the ends of the flexible legs. When the flexible legs and gripping elements are extended through an opening in the wall, a center pin can be pushed into the cylindrical portion to expand the flexible legs so that the gripping elements can engage the back of the wall. In one embodiment, removal of the center pin causes the flexible legs to contract whereupon the assembly can be removed from the wall.

6 Claims, 2 Drawing Sheets

BLIND FASTENER ASSEMBLY AND RELEASE PIN APPARATUS

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION (1) Field of the Invention

The invention relates generally to fastener systems and more particularly to a blind fastener assembly and release pin apparatus and method.

(2) Description of the Prior Art

In general, fasteners are used in a variety of industry applications, including construction, machining, and the like. Blind through-hole fastener applications are problematic in certain situations because the internal sides of the materials to be connected are not normally readily accessible by tools, making it difficult to use conventional methods of hanging and clamping items.

In many cases, prior art blind fasteners are for one time use and are not easily removed.

One type of blind through-hole prior art fastener makes use of screws that require an internal material (wood or metal stud for example) that the screw can mount to. However, if the internal material is not present, the screws won't be effective.

Another example of prior art are "molly bolts" which function by being increasingly tightened to increase the diameter thereof and thereby grip the inside walls of a drilled hole. This prior art fastener will often not completely engage the material used to anchor the fastener, resulting in the fastener performing a spinning motion or, if in place, cannot be tightened to an appreciable holding force. This results in damaging the material, such as a wall, to which the fastener is being attached without providing any meaningful ways to clamp or hang a second item to the wall.

The present invention comprises a new and improved fastener with a release and engage pin for fastening and releasing parts together in a rapid and secure manner, while still providing for the external ability to adjustably tighten or loosen the tension of the pin with respect to the wall. Accordingly, those of skill in the art will appreciate the present invention, which addresses the above discussed and other problems.

SUMMARY OF THE INVENTION

An object of the present invention is to provide an improved blind fastener and release pin that can be utilized more quickly and reliably than conventional fastening methods.

Another object of the present invention to provide an improved blind fastener assembly comprising a fastener with a center pin for fastening and releasing the assembly from a wall in a rapid yet secure manner.

Still another object of the invention is to provide an improved blind fastener and releasable center pin that can be tightened securely to external wall material, which provides a pin that is sturdily secured to the external wall material to, for example, hang or support items as desired.

Other objects and advantages of the present invention will become apparent from the following description, taken in connection with the accompanying drawings, wherein, by way of illustration and example, an embodiment of the present invention is disclosed. However, it will be understood that the present invention is not limited to the above and/or other objects of the invention.

In accordance with one embodiment of the present invention, a blind fastener assembly is provided for mounting to a wall through an opening in the wall. The opening in the wall comprises an inner diameter and the wall comprises a first surface, which may be the wall outer surface, and a second surface on an opposite side thereof, which may not be readily accessible.

The blind fastener assembly may comprise a spring pin comprising a length extendable through the first surface and the second surface of the wall. The spring pin comprises a cylindrical portion and a plurality of expandable legs extending from the cylindrical portion. The expandable legs have expandable leg ends. The cylindrical portion further comprises a plurality of threads on an outside of the cylindrical portion. The spring pin defines an interior receptacle. A plurality of gripping elements are positioned adjacent the expandable leg ends. The gripping elements extend radially outwardly from the expandable leg ends. The gripping elements and the expandable leg ends are moveable between a collapsed position and an expanded position. The plurality of gripping elements are sized to fit within the inner diameter of the opening in the wall in the collapsed position.

The assembly may further comprise a center pin receivable into the receptacle of the spring pin. The center pin comprises a length and a diameter operable to selectively engage an interior of the plurality of expandable legs for expanding the expandable leg ends radially outwardly. Accordingly, when the plurality of gripping elements are extended past the first surface, which may be the outer wall surface, and the second surface, which may be an inner wall surface, then the center pin is moveable within the receptacle to urge the expandable legs to the expanded position so that the plurality of gripping elements are expanded to a size greater than the inner diameter of the opening in the wall.

A nut may be mountable to the threads on the spring pin and positioned for applying selectable tension against the first surface and for urging the gripping elements against the second surface of the wall as the nut is rotated.

In one embodiment, the center pin is sufficiently retractable from the receptacle to allow the plurality of expandable legs and the plurality of gripping elements to return to the collapsed position whereby the blind fastener assembly is removable from the wall.

The plurality of expandable legs may be comprised of spring material biased toward the collapsed position so that when the center pin is sufficiently retracted from the receptacle of the spring pin, then the expandable legs automatically move to the collapsed position.

In another embodiment, the plurality of expandable legs is comprised of a sufficiently resilient material to be operable for repeated insertion and removal. The center pin may be axially moveable within the receptacle of the spring pin.

The blind fastener assembly may further comprise at least one ball-detent connection provided between the spring pin and the center pin, the ball-detent connection is engagable in the expanded position. When engaged, the ball-detent connection resists additional relative axial movement between the spring pin and the center pin.

In another embodiment, the blind fastener assembly may comprise a fixture on the center pin operable for receiving a tool for rotation of the center pin to engage and disengage the ball-detent connection. The center pin may be substantially cylindrical.

The plurality of gripping elements may further comprise a plurality of teeth positioned for engagingly gripping the second surface of the wall. In another embodiment, the plurality of gripping elements comprise a rounded end portion operable to guide the plurality of gripping elements through the opening in the wall.

In yet another embodiment, the blind fastener assembly may further comprise a sheet of material positionable against the first surface of the wall. In this example, the spring pin and the nut are operable for selectively securely mounting the sheet of material to the first surface of the wall.

The blind fastener assembly may further comprise engagement surfaces respectively for each of the plurality of gripping elements. The engagement surfaces may be substantially parallel to the second surface of the wall.

DETAILED DESCRIPTION OF THE INVENTION

Figure 1:
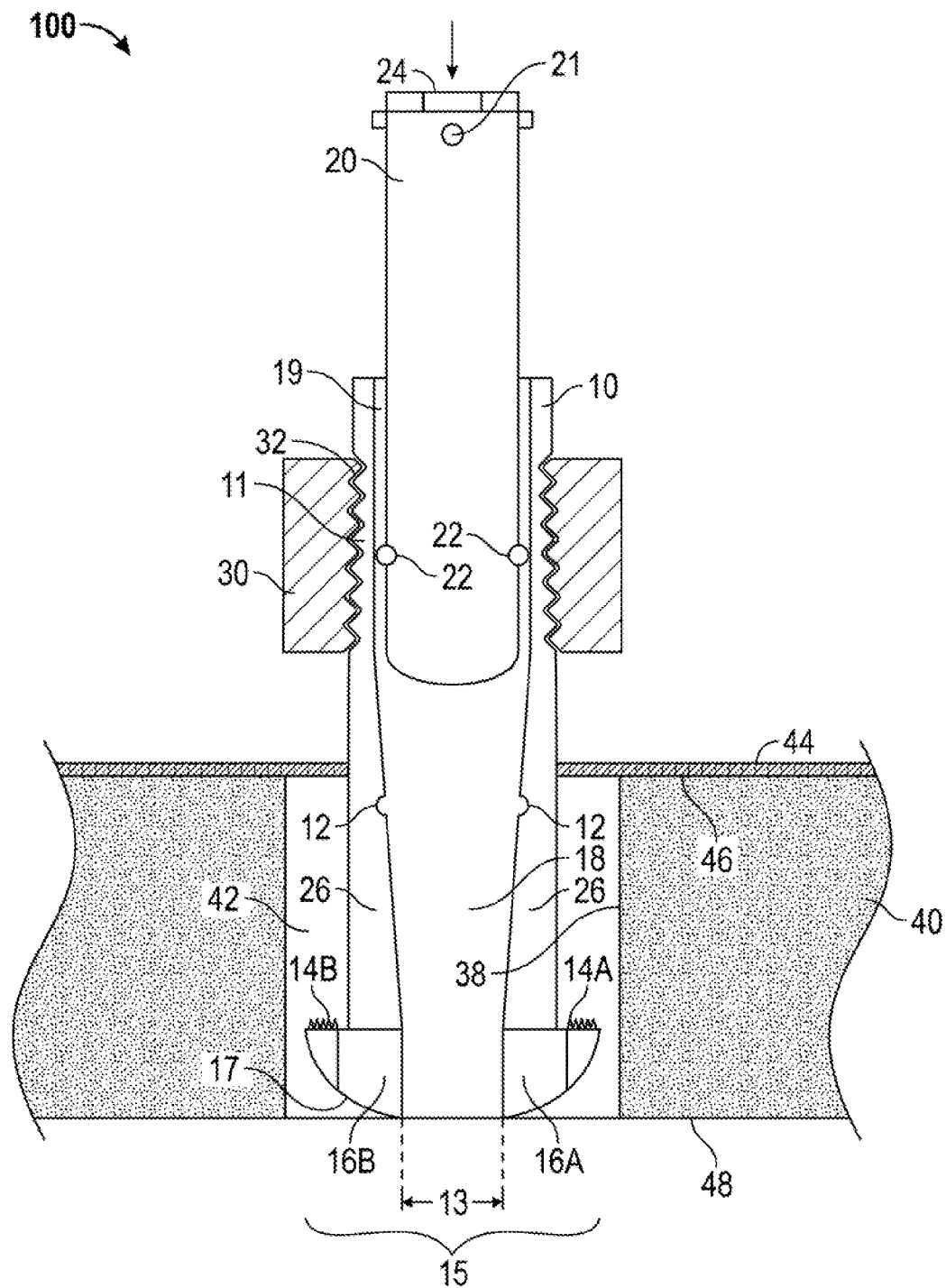
FIG. 1 is an elevational view, partially in cross-section, which illustrates a blind fastener assembly within an opening in a wall, which is in a disengaged or collapsed position whereby the blind fastener may either be inserted further into the wall or removed from the wall in accord with one possible embodiment of the invention.

Referring now to the drawings, and more particularly to FIG. 1, there is depicted one possible embodiment of blind fastener assembly 100. Blind fastener assembly 100 can be utilized in a wall with outer wall surface 46 and inner wall surface 48. Additional layers of material, such as sheet material 44, may also be mounted to the wall, if desired.

While the term "wall" is used, in accord with this specification the term "wall" may refer to any type of structure in which the pin may be utilized. Inner wall surface 48 is normally not readily accessible and therefore the connector is referred to as a blind fastener assembly. Wall material 40 may comprise drywall, wood, or other materials, and could comprise multiple interior walls or surfaces.

In FIG. 1, blunt nose 15 is in a disengaged or collapsed position as indicated by distance 13 between blunt nose ends or grippers 16A and 16B. In the disengaged position, the outer diameter of blunt nose 15 is small enough so that blunt nose 15 can easily be inserted into hole 42 having inner diameter 38.

Blunt nose 15 may be supported by flexible legs 26 that extend from body 11 of spring pin 10. In this illustrated embodiment, spring pin 10 utilizes two legs 26 although additional split flexible legs may be utilized without departing from the scope of the invention. For example, three or four substantially identical split legs might be utilized in the same manner as discussed hereinafter for two legs. In one embodiment, the legs comprise spring material which can be biased inwardly to the collapsed or disengaged position and then expanded outwardly by axial movement of center pin 20 to an engaged or expanded position in a manner discussed hereinafter. Accordingly, center pin 20 could also be referred to as an engage/release pin.

Legs 26 are separate and may be comprised of a spring-like or flexible material whereby it may or may not be necessary to compress nose ends or grippers 16A and 16B of blunt nose 15 together to insert blunt nose 15 into hole 42.

In one possible embodiment, legs 26 may compress inwardly when inserted into hole 42 and then spring outwardly when blunt nose 15 extends past inner wall 48. However, in a preferred embodiment, legs 26 may be made so that distance 13 simply retains a size that fits into hole 42 or could conceivably be spring biased inwardly so that distance 13 is smaller or there is no gap between the legs in the collapsed position. Legs 26 and nose ends 16A and 16B can then be expanded outwardly to engage inner wall surface 48 of wall 40 in the manner explained hereinafter. Hole 42 will preferably be drilled or created so the size or outer diameter of blunt nose 15 fits into inner diameter 38 of hole 42.

Figure 2:
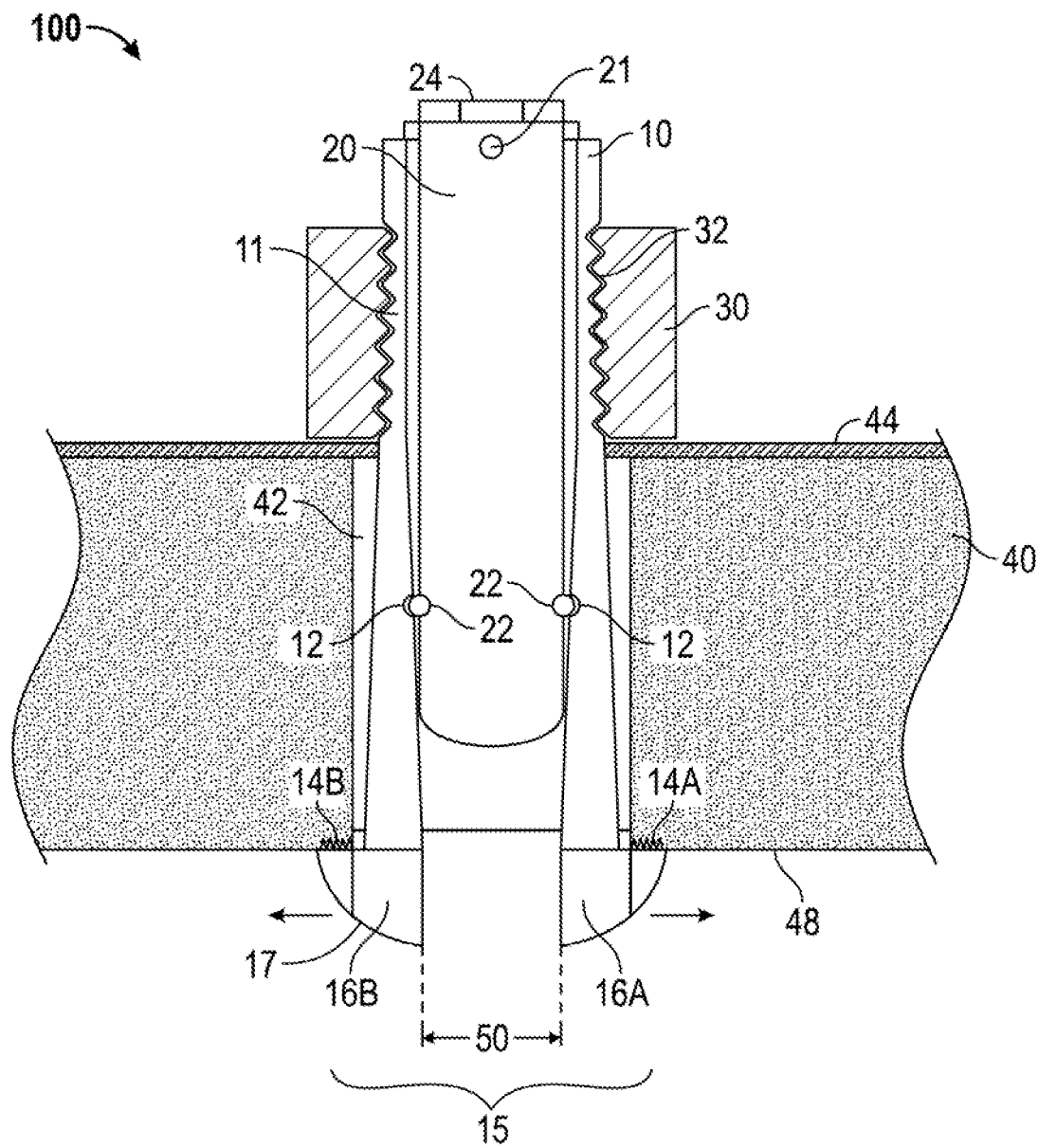
FIG. 2 is an elevational view, partially in cross-section, which illustrates the blind fastener assembly in an engaged or expanded position to affix the fastener to the wall in accord with one possible embodiment of the invention.

In one possible embodiment, upper body 11 or some upper portion of spring pin 10 is tubular or cylindrical. Spring pin 10 may preferably be a one-piece element with a cylindrical upper body 11 from which a plurality of flexible legs 26 extend. Upper body 11 may comprise upper receptacle or opening 19 into which center pin 20 can be inserted. Spring pin 10 further comprises tapered receptacle 18 between flexible legs 26. Nose ends or grippers 16A and 16B extend radially outwardly from the ends of legs 26. Tapered receptacle 18 is an extension of opening or receptacle 19 into which center pin 20 is inserted to move flexible legs 26 outwardly when center pin 20 is further inserted into the opening as shown in FIG. 2.

Nose ends or grippers 16A and 16B may have a rounded lower end 17 for easier and guiding insertion into hole 42 in the wall. In another embodiment, blunt nose portion 15 could have a more pointed end. Nose ends or grippers 16A and 16B comprise engagement surfaces 14A and 14B which may preferably but are not necessarily required to have teeth as shown in FIG. 1 and FIG. 2 for frictionally engaging inner wall surface 48 as discussed hereinafter. Engagement surfaces 14A and 14B are preferably generally parallel to inner wall surface 48 and may have an area that depends on the number of flexible legs 26, the size of opening 42, and related factors.

In one possible embodiment, spring pin 10 with blunt nose portion 15 further comprises one or more receptors or detents 12, which can receive ball shaped elements 22 on center pin 20. Typically, this may be referred to herein as a ball-detent connection. Alternatively, the ball-detent connection could have the ball shaped elements on legs 26 and the receptors could be on center pin 20. When center pin 20 is moved axially with respect to legs 26 to the correct axial position, then center pin 20 can be rotated, perhaps with a socket drive on nut 24 to engage and disengage the ball-detent connection. In another embodiment, a detent-ball release mechanism may be provided in a central part of center pin 20 as is sometimes used with detent-ball release mechanisms, which can be affixed in position with a cotter pin (not shown) through opening 21. If the cotter pin is removed from opening 21 and center pin 20 is rotated with respect to the ball release mechanism, such as with nut 24, then the detent balls may be released. As discussed hereinafter, the engaged ball-detent connection prevents or resists relative axial movement between center pin 20 and spring pin 10.

Center pin 20, which may also be referred to herein as a release and engage pin, is an elongated member sized to be received within and expand the tapered receptacle 18 of spring pin 10. Tapered receptacle 18 may have a rounded interior surface if desired and center pin 20 may preferably be rounded or cylindrical. As noted above, ball projections 22 can be positioned so they are oriented to mate with detents 12 on expandable legs 26, respectively. This occurs when release and engage center pin 20 is axially moved to or positioned in the expanded or engaged position as discussed hereinafter in reference to FIG. 2.

Nut 30 and the outer cylindrical surface of body 11 preferably comprise a threaded connection 32 whereby nut 30 can be screwed onto the outside of body 11 of spring pin 10. Nut 30 can be utilized to tighten blind fastener assembly 100 against the wall with a desired or selectable amount of tension.

In operation, hole 42 is drilled through material 40, which may comprise multiple surfaces, including a wall by way of example, and is referred to herein as a wall even though the wall may comprise multiple walls, panels, or the like. Nose 15 of spring pin 10 is pushed into hole 42 in surface 40 as shown in FIG. 1 and then further pushed into hole 42 until nose ends or grippers 16A and 16B extend past inner wall surface 48. At this point, legs 26 of spring pin 10 are free to expand allowing nose ends or grippers 16A and 16B to move outward for gripping a backside of inner wall surface 48.

In one embodiment, spring pin 10 can be made to spring outwardly on exit from shaft 42. In a preferred embodiment, spring pin 10 is made to simply hold the dimension of shaft 42 or be compressed together until engage and release center pin 20 is pushed into tapered receptacle 18 of spring pin 10 to expand flexible legs 26 and nose ends or grippers 16A and 16B radially outwardly. In other words, engage and release center pin 20 is pushed into spring pin 10 and effectively forces flexible legs 26 and grippers 16A and 16B radially outward as indicated by arrow 50 in FIG. 2 such that blunt nose portion 15 is now larger in diameter than the inner diameter of shaft or hole 42.

Engage and release center pin 20 is extended to the correct depth in spring pin 10, which may be marked for this purpose with a line (not shown) or the like on center pin 20, if desired. At this relative axial position between center pin 20 and spring pin 10, a twist of engage and release pin 20 relative to spring pin 10 allows ball shaped extensions 22 to engage mating receptacles or detents 12 to provide the ball-detent connection. As discussed previously, if utilized with a ball-release mechanism centrally positioned within center pin 20, which is held in position with a cotter pin through hole 21, the cotter pin would be removed prior to rotation. As noted above, a nut such as hex nut 24 may be utilized with a suitable wrench for twisting engage and release pin 20. The ball-detent connection locks spring pin 10 with engage and release center pin 20 together to prevent or resist further relative axial movement between spring pin 10 and center pin 20. Nut 30, which may be a hex nut or the like, may already be threaded into place and/or may be connected and rotated to selectively tighten the desired tension against the wall outer surface as needed depending on the application. Teeth on engagement surfaces 14A and 14B on the reverse side of nose ends or grippers 16A and 16B effectively grip the backside of the wall material allowing for further friction gripping of blind fastener assembly 100 against the wall as needed.

In this way, blind fastener assembly 100 may be effectively fastened to and extend from outer surface 46 of the wall. As well, or in addition, layered materials such as plates, additional wall material, pictures or the like, any type of which may be indicated by item 44, may be clamped between outer wall surface 46 and nut 30 to hold them in place.

In one embodiment, removal simply requires nut 30 to be backed off of threads 32. Depending on the application, engage and release pin 20 is then twisted relative to spring pin 10 so that ball elements 22 disengage from detents 12. Engage and release center pin 20 is then axially retracted or completely removed from tapered receptacle 18 of spring pin 10. In one embodiment, flexible legs 26 and grippers 16A and 16B are biased to then contract to the collapsed or disengaged position to allow spring pin 10 to be extracted from shaft 42.

Thus, in this embodiment blind fastener assembly is quickly and easily removable, if desired. Moreover, because the assembly is resilient, the assembly may be mounted and removed frequently.

It will be understood that many additional changes in the details, materials, steps and arrangement of parts, which have been herein described and illustrated in order to explain the nature of the invention, may be made by those skilled in the art within the principle and scope of the invention as expressed in the appended claims.

The foregoing description of the preferred embodiments of the invention has been presented for purposes of illustration and description only. It is not intended to be exhaustive or to limit the invention to the precise form disclosed; and obviously many modifications and variations are possible in light of the above teaching. Such modifications and variations that may be apparent to a person skilled in the art are intended to be included within the scope of this invention as defined by the accompanying claims.

What is claimed is:

1. A blind fastener assembly for mounting to a wall through an opening in said wall, the opening having an inner diameter and the wall having a first surface and a second surface on opposite sides thereof, comprising:
 - a spring pin having a length extendable through said first surface and said second surface of said wall, said spring pin comprising:
   - a cylindrical portion defining an interior receptacle and having a plurality of threads on an outer surface thereof,
   - a plurality of expandable legs extending from said cylindrical portion, said plurality of expandable legs forming a tapered receptacle extending from said interior receptacle, each of said plurality of expandable legs having an expandable leg end with a gripping element extending radially outward therefrom,
   - wherein said gripping elements and said expandable leg ends are moveable between a collapsed position and an expanded position, said plurality of gripping elements being sized to fit within the inner diameter of the opening in the wall when in said collapsed position;
 - a center pin receivable into said interior receptacle and said tapered receptacle of said spring pin, said center pin being mounted for selectable rotation within said interior receptacle during operation of said blind fastener assembly, said center pin having a length and a diameter operable to selectively engage said expandable legs when inserted into said tapered receptacle for displacing said expandable leg ends and said gripping elements radially outwardly into said expanded position, wherein said gripping elements are expanded to a size greater than the inner diameter of the opening in the wall;
 - a nut mountable to said threads on said spring pin and positioned for applying selectable tension against the first surface of the wall and for urging the gripping elements against the second surface of the wall as said nut is rotated;
 - means for rotatably disengaging said center pin in said tapered receptacle of said spring pin when said expandable legs are in said expanded position, said means comprising at least one ball-detent connection provided between said spring pin and said center pin, said ball-detent connection being engagable in said expanded position so that when engaged said ball-detent connection resists additional relative axial movement between said spring pin and said center pin; and a fixture on said center pin operable for receiving a tool for rotation of said center pin to engage and disengage said ball-detent connection.

2. The blind fastener of claim 1, whereby said expandable legs are biased to retract into said collapsed position when said center pin is not inserted into said tapered receptacle of said spring pin.

3. The blind fastener assembly of claim 2, wherein said expandable legs are comprised of a resilient material to permit repeated expansion and collapse of said expandable legs.

4. The blind fastener of claim 1, wherein said gripping elements comprise engagement surfaces having teeth.

5. The blind fastener assembly of claim 1, wherein said center pin and said spring pin are substantially cylindrical.

6. The blind fastener assembly of claim 1, wherein said gripping elements form a rounded end portion operable to guide said plurality of gripping elements during insertion through said opening.

* * * * *